United States Patent [19]

Bowling

[11] Patent Number: 4,913,253

[45] Date of Patent: Apr. 3, 1990

[54] MOTOR DRIVEN TUG VEHICLE

[75] Inventor: John M. Bowling, Orville, Ohio

[73] Assignee: Rayco Manufacturing, Inc., Wooster, Ohio

[21] Appl. No.: 278,456

[22] Filed: Dec. 1, 1988

[51] Int. Cl.$^4$ ............................................. B62D 61/08
[52] U.S. Cl. ...................... 180/210; 180/904
[58] Field of Search ............... 180/210, 211, 213, 215, 180/904

[56] References Cited

U.S. PATENT DOCUMENTS

| | | | |
|---|---|---|---|
| 2,732,088 | 1/1956 | Arnot | 180/904 |
| 2,867,451 | 1/1959 | Repke | 180/904 |
| 2,877,911 | 3/1959 | Arnot | 180/904 |
| 2,942,677 | 6/1960 | Gray | 180/212 |
| 3,049,253 | 8/1962 | Cabral | 180/904 |
| 4,057,158 | 11/1977 | Lissy | 180/904 |
| 4,516,648 | 5/1985 | Berger et al. | 180/210 |
| 4,632,625 | 12/1986 | Schuller et al. | 180/904 |
| 4,662,468 | 5/1987 | Ethier | 180/215 |
| 4,823,895 | 4/1989 | Kimball | 180/210 |

*Primary Examiner*—David H. Brown
*Attorney, Agent, or Firm*—Oldham & Oldham Co.

[57] ABSTRACT

This invention relates to a motor driven tug vehicle which utilizes essentially three wheels, two parallel independently controlled driven wheels and a rearward balancing, fully pivotal dolly wheel, and wherein the vehicle operator is located essentially between and directly over the driven wheels so as to be immediately adjacent the connecting hitch, and having it in the visual line of sight, whereby precise control of the independent drive wheels in a forward and reverse direction can allow very controlled and precise maneuvering of the vehicle and the hitch as selectively desired by the vehicle operator.

5 Claims, 2 Drawing Sheets

MOTOR DRIVEN TUG VEHICLE

TECHNICAL FIELD

Broadly, this invention relates to a motor driven tug vehicle that is particularly adapted to move airplanes at an airport.

This invention specifically relates to a novel motor driven vehicle which utilizes two independently driven wheels, with the wheels mounted in parallel relationship to each other. Separate controls allow selective forward or reverse movement of each of the wheels independently. Balance to the unit is achieved by a third dolly wheel. The vehicle operator sits essentially between the two driven wheels, and immediately facing the tug connection link so that excellent visibility with the aircraft is provided, and excellent maneuver control is achieved by the independent motorized operation of each of the wheels independently.

BACKGROUND ART

Motorized tugs are widely known and have been utilized in connection with moving aircraft at large and small airports for many years, and particularly are important in connection with the modern jetway entrances to today's modern jets. This is true because the jets are moved into position at the jetway, and in that position, do not have the ability because of the position of the jet engines to move away by themselves. Thus, backing the plane away from the jetway and getting it into position where it can operate independently is standard practice at all airports. Also, it is well known that motorized tugs are utilized to move airplanes around in a hanger configuration, and in many of these instances, the movement must be very accurately controlled because of limited space and the presence of other aircraft.

In addition, tug vehicles have long been utilized in factory environments for moving carts or merchandise, or in connection with moving other non-motorized vehicles such as trailers, storage containers, and the like.

However, heretofore all prior art tug vehicles have been four wheel, with drive through the fixed rear wheels and turning with the steerable front wheels. This causes a larger turning radius and decreases the visibility of the tug operator to see the hitch and the specific moving relationship of the aircraft.

OBJECTS OF THE INVENTION

The fundamental object of the invention is to provide an improved motorized tug vehicle wherein the vehicle operator has greater visibility with respect to the tug requirements because the operator is positioned essentially over the tug connecting point to the unit being maneuvered, thus, having much greater visual control over the movement of the unit.

A further object of the invention is to provide parallel mounted drive control wheels which are independently driven and controlled, and are very nearly at the pivot point of the tug connecting pole so as to provide essentially immediate motion control response to the end of the tug pole so as to very accurately control the movement and maneuvering of the unit or the airplane being moved by the tug vehicle.

A further object of the invention is to provide very simple lever controls for independently operating the drive wheels of the vehicle wherein operator training is minimal and control is immediate and accurate.

A still further object of the invention is to provide very simplified motor control to the vehicle and simplified braking to control the independently driven wheels.

A further object of the invention is to make a vehicle that is essentially specifically designed as a tug vehicle for aircraft, and is optimum for that particular purpose, but which is inexpensive, and yet extremely efficient in its functionality.

DESCRIPTION OF THE DRAWINGS

For a better understanding of the invention, reference should be made to the accompanying drawings wherein.

BEST MODE OF THE INVENTION

Figure 1:
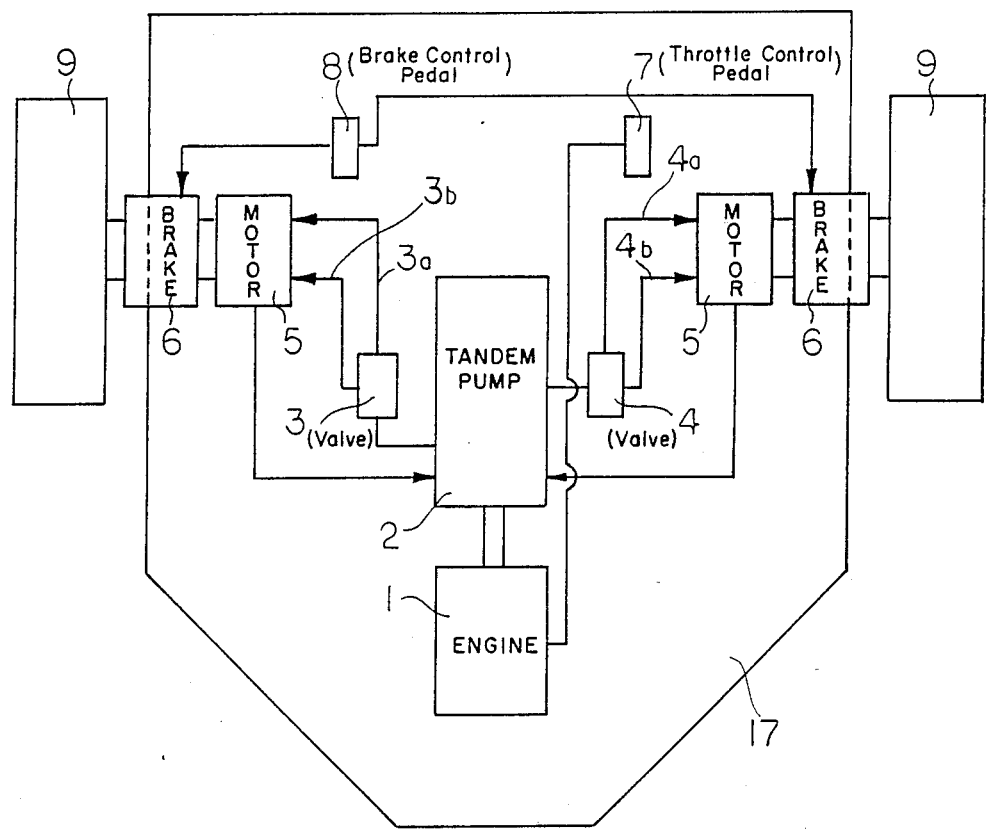
FIG. 1 is a block schematic diagram showing the essential shape of the tug vehicle, and the principal mechanical components involved in its motorized and controlled operation.

Referring to FIG. 1 of the drawings, the numeral 17 designates the basic frame of the tug vehicle structure, with the mechanical operating units mounted to the frame. It is to be understood that FIG. 1 is simply a schematic showing, and does not depict the exact shape of the frame, nor the exact positional relationship of the combined components, but is designed to show the overall operating characteristics of the mechanism of the motorized tug vehicle.

A motor or engine is indicated by numeral 1, and this may be a suitable gasoline driven engine, or a diesel engine, or whichever is easier and more efficient for airport operation. Typically, the engine may be of approximately 40 horsepower, and may be either air or fluid cooled depending on the specific operating environment.

The engine 1 propels a tandem pump 2, comprising two identical hydraulic pumps, each pump connected to a suitable hydraulic motor 5 through respective values 3 and 4.

From a schematic standpoint, the hydraulic tandem pump 2 provides pressurized hydraulic fluid into respective valves 3 and 4, valve 3 controlling the operation of the left wheel, with valve 4 controlling the operation of the right wheel. As is more clearly shown in the perspective view of FIG. 2, independent manually actuated levers control the opening and closing of the respective valves 3 and 4, and fluid control to respective outlet ports which passes the hydraulic fluid either with respect to a forward or reverse motion of the respective wheel with which the valve is associated. Thus, looking particularly at valve 3, a movement of the manual control lever forward will cause an increasing amount of hydraulic fluid out on line 3a to the left wheel drive motor 5 causing a rotation of the motor in the forward direction, and, hence, causing a controlled forward rotation of the wheel 9. Conversely, a rearward movement of the manual control lever will cause a controlled hydraulic fluid flow through line 3b into the reverse directional movement of motor 5, and, hence, causing a selective reversed controlled movement to the left wheel 9. Exactly similar control through the valve 4 is provided on lines 4a and 4b to control the right wheel 9.

Right and left block 6 indicates brake mechanisms which would be typically some type of friction disc braking system which are in a normally activated (applied) position as a result of pressure applied by an integral spring mechanism, and wherein a brake control pedal 8 is depressed, activating an electrical solenoid which directs hydraulic pressure to the spring activated braking mechanisms, releasing the friction discs and allowing the tug to move forward or backward. Releasing brake control pedal 8 deactivates the electrical solenoid which causes hydraulic pressure to by-pass the spring activated braking mechanisms which in turn causes the brakes to be activated. This fail-safe arrangement negates the requirement for the operator to manually engage a parking brake.

The control of the revolutions of the motor 1, and, hence, the amounts of hydraulic pressure being supplied is achieved through the throttle control pedal 7, as controlled through the right foot of the vehicle operator, and, of course, this operates in the same way as any motor driven vehicle throttle control.

Figure 2:
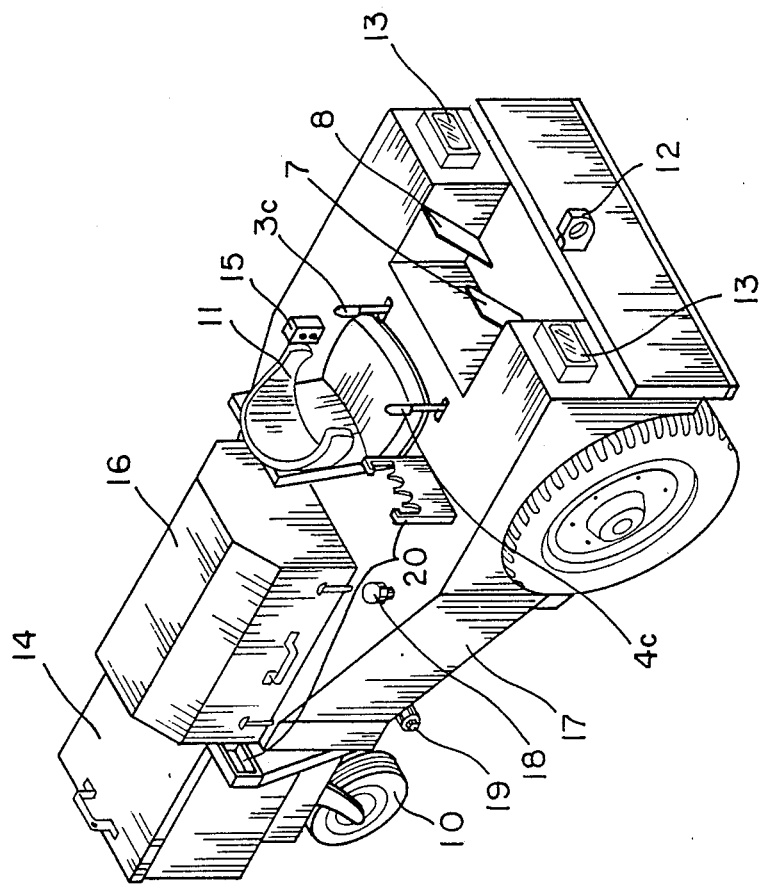
FIG. 2 is a perspective view of the top of the vehicle showing the seating position of the operator, the location of the tug control connection point, and the independent operating levers for the parallel positioned independent wheel drive.

Now looking at the perspective of FIG. 2, the actual functional operation of the vehicle will be described.

The balancing of the vehicle is achieved by a single 360° pivotal dolly wheel 10 which is mounted essentially opposite and uniformly between the parallel drive wheels 9.

The operator sits in a seat 11 with his feet projecting onto the respective brake pedal 8 and throttle pedal 7. The forward and reverse independent control levers 3c and 4c are located where indicated and actually have frame limit stops associated with the vehicle frame to assure a controlled limited movement of the levers in the forward and reverse directions.

The tug hitch is indicated by numeral 12, and it is at this point that the normal pull connection will be made between the tug vehicle and the nose wheel of an aircraft, in exactly the same connecting technique as currently utilized by the tug vehicles at the airport. Vehicle operating lights are indicated by numeral 13. A suitable tool box located above the dolly wheel is indicated by numeral 14. A starting switch for on and off of the engine is indicated by numeral 15. A cover for the vehicle engine and the hydraulic motor pump, numerals 1 and 2, is indicated by numeral 16. The fuel supply port is indicated by numeral 18, and the muffler and exhaust is indicated by numeral 19. A suitable storaage rack for carrying the tug connecting poles for the hitch 12 to the aircraft are shown by the combined bracket arrangements 20.

Thus, it should be understood that the respective drive wheels 9 are mounted in a fixed parallel relationship to each other, but may be independently rotated in a forward or a reverse direction by the independent control levers 3c and 4c, and at a control rotation rate, thus providing a very specific and precise control of the position of the hitch 12. Since the operator is located in the seat 11, such operator is essentially between the drive wheels 9 and immediately adjacent and visually able to see the connecting point at hitch 12 of the connecting pole to the aircraft or other unit being controlled, and, thus able to make precise controlled movements of the hitch 12 by the independent control of the drive wheels 9. Naturally, the balance of the vehicle simply follows that movement with the dolly wheel 10 allowing any type of pivotal movement desired.

It has been determined that essentially the triangular shape to the vehicle appears to be desirable with the drive wheels located at two of the corners of the triangle and the dolly wheel located at the other, and because of the location of the engine, the weight of the vehicle is pretty well distributed, and yet allows plenty of drive power to be achieved through the drive wheels 9 by the independent control thereof by the vehicle operator.

Thus, it is seen that the objects of the invention have been achieved by providing a tug vehicle in which the operator has direct visibility of the hitch, and by independently being able to control the forward and reverse rotation of the fixed parallel drive wheels, very minute and precise control positioning of the hitch 12 can be achieved, with very little experience and expertise needed by the operator. The vehicle is simple, yet extremely efficient and provides a significant enhanced operability over the conventional four-wheel, front steering wheel type tug vehicles currently utilized today for this same aircraft maneuvering requirement.

While in accordance with the patent statutes, only the preferred embodiment of the invention has been illustrated and described in detail, and is to be particularly understood that the invention is not limited thereby, but that the inventive scope is defined in the appended claims.

What is claimed is:

1. A tug vehicle which comprises:
    a generally triangularly shaped frame,
    a pair of independently driven, essentially parallel wheels generally mounted at two corners of the frame,
    a dolly wheel at the other corner of the frame,
    control seat means located generally between the drive wheels,
    a power supply operatively connected to power said independently driven wheels,
    two independent control means for distributing the output from said power supply, one said independent control means is located on each side of the control seat means to selectively effect forward or reverse rotation of the drive wheels to control the movement of the tug vehicle, and
    a hitch located essentially midway between the independently driven wheels and which is exposed to the line of view of the operator.

2. A tug vehicle according to claim 1 where the independent control means are hand controlled levers located on the left and right sides of the control seat to be manually controlled by the left and right hands respectively, of a vehicle operator.

3. A tug vehicle according to claim 2 which includes a brake means and brake means controls for regulating said brake means actuated by a vehicle operator to simultaneously brake the drive wheels.

4. A tug vehicle according to claim 3 which includes an engine and hydraulic motor to provide the power to the independently driven wheels, and further includes an accelerator pedal controlled by a vehicle operator to control the speed of the engine.

5. A tug vehicle according to claim 4 wherein independent valve means are associated with each independent control means to selectively control the hydraulic fluid pressure to the rotating drive of the drive wheels.

* * * * *